US011927159B1

(12) United States Patent
Bishop et al.

(10) Patent No.: US 11,927,159 B1
(45) Date of Patent: Mar. 12, 2024

(54) SECONDARY AIR PATH FOR AN AIR INDUCTION SYSTEM

(71) Applicant: FORD GLOBAL TECHNOLOGIES, LLC, Dearborn, MI (US)

(72) Inventors: Christopher B. Bishop, South Lyon, MI (US); Angela D. Pyle, Canton, MI (US); John Emley, Canton, MI (US); Roger Joseph Khami, Troy, MI (US); Ivan Lage Matos, Lauro de Freitas Bahia (BR)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 18/156,057

(22) Filed: Jan. 18, 2023

(51) Int. Cl.

| | |
|---|---|
| ***F02M 35/10*** | (2006.01) |
| ***F01N 3/32*** | (2006.01) |
| ***F02M 35/02*** | (2006.01) |
| ***F02M 35/08*** | (2006.01) |

(52) U.S. Cl.
CPC ......... *F02M 35/10222* (2013.01); *F01N 3/32* (2013.01); *F02M 35/0205* (2013.01); *F02M 35/082* (2013.01); *F02M 35/10262* (2013.01)

(58) Field of Classification Search
CPC ......... F02M 35/10222; F02M 35/0205; F02M 35/082; F02M 35/10262; F01N 3/32
See application file for complete search history.

(56) References Cited

U.S. PATENT DOCUMENTS

| | | | | |
|---|---|---|---|---|
| 6,145,302 | A * | 11/2000 | Zhang | F01N 11/002 60/299 |
| 6,267,006 | B1 | 7/2001 | Bugli et al. | |
| 8,327,628 | B2 | 12/2012 | Ruona et al. | |
| 9,151,200 | B2 | 10/2015 | Zhang et al. | |
| 2007/0261394 | A1* | 11/2007 | Mandrusiak | F02M 35/10144 60/289 |
| 2009/0241683 | A1* | 10/2009 | Perr | G01F 15/185 123/391 |
| 2010/0126149 | A1* | 5/2010 | Kondou | F01N 3/32 60/287 |

* cited by examiner

*Primary Examiner* — Syed O Hasan
(74) *Attorney, Agent, or Firm* — Vincent Mastrogiacomo; Brooks Kushman P.C.

(57) ABSTRACT

An air induction system is disclosed for an engine that comprises an air cleaner, an inlet air conduit, a Mass Air Flow Sensor (MAFS), and a secondary air induction system. The air filter encloses a filter element that removes contaminants from the air supplied to the engine. A MAFS is disposed in the inlet air conduit and measures the mass of the air flowing through the inlet air conduit to an intake manifold of the engine and provides data to an engine control module that controls the air/fuel mixture supplied to the engine. The secondary air system receives air from the air cleaner that is provided to a vehicle component and includes an inlet port located upstream from the MAFS. The secondary induction conduit draws air through a port integrated with the MAFS bore with an air pump to provide clean air to an engine component or exhaust system component.

20 Claims, 5 Drawing Sheets

SECONDARY AIR PATH FOR AN AIR INDUCTION SYSTEM

TECHNICAL FIELD

This disclosure relates to air induction systems for vehicles that provide a secondary flow of filtered air downstream of the engine.

BACKGROUND

Air aspirated and turbocharged engines may include a Mass Air Flow Sensor (MAFS) that provide signals to the engine controller to control the air/fuel mixture for an internal combustion engine including diesel engines. MAFS sensors with low signal to noise ratios are required for accurate calibration, and can be negatively affected by air flow disturbances upstream from the MAFS. Air flow disturbances can be created through ancillary systems affecting air flow profiles, such as pulsations caused by an air pump in a secondary flow path. Air flow disturbances can cause air turbulence upstream of the MAFS sensor. The MAFS sensor output signal quality will be degraded with high noise-to-signal ratios. High noise-to-signal ratios in the MAFS sensor output can cause the engine calibration to become inaccurate. Flow straightening structures upstream of the MAFS can change the air flow velocity profile upstream of the air meter for MAFS sensor signal quality. Flow straightening or air flow conditioning structures create air flow restriction but may reduce engine horsepower.

Secondary air paths required for secondary air flow to various vehicle systems, or thermactors, require a source of filtered (clean) air. The most efficient location in an Internal Combustion Engines (ICE) is to receive secondary air flow from the clean side of the air induction system—but this presents a problem with the interaction with the MAFS. Drawing air from a location downstream of the MAFS reduces the amount of air reaching the engine as compared to the amount of air measured by the MAFS. The mass rate of air reported by MAFS, is compared to a calibration transfer function table for air/fuel control and other calibration parameters that use the engine mass flow rate. Placing the secondary air inlet port upstream of the MAFS can alleviate this but pressure pulsations caused by the secondary air pump can induce an oscillating pressure wave emanating from the air inlet port. Placing the secondary air inlet port upstream of the MAFS can also cause electronic measurement noise in the MAFS signal.

Packaging the secondary air inlet port upstream of the Air Induction System (AIS) can result in quality issues, using non-filtered air as well as location/orientation constraints due to lack of available space for ports and hoses. Additional components and assembly steps tend to increase piece count, weight, and complexity.

This disclosure is directed to solving the above problems and other problems as summarized below.

SUMMARY

According to one aspect of this disclosure, an air induction system is disclosed for an engine. The air induction system comprises an air cleaner, an inlet air conduit, a mass air flow sensor (MAFS), and a secondary air system. The air cleaner assembly encloses a filter element that removes contaminants from the air supplied to the engine. The clean air conduit is downstream from the air cleaner that supplies air to the engine. The MAFS is inserted in the inlet air conduit and measures the mass of the air flowing through the air conduit to an intake manifold of the engine. The MAFS also provides data to an engine control module that controls the air/fuel mixture supplied to the internal combustion engine. The secondary air system receives air from the air cleaner that is provided to a vehicle component and includes an inlet port located upstream from the MAFS, a secondary conduit isolated from the inlet air conduit, and an air pump that draws air into the inlet port. The secondary conduit is disposed radially outboard of the inlet air conduit.

According to another aspect of this disclosure, an apparatus is disclosed that comprises an engine having an air induction system that supplies air to the engine at a controlled rate by an engine control module that controls the air/fuel mixture provided to the engine. The air induction system includes a MAFS. A secondary air flow system provides air to a vehicle component, the secondary air system includes an inlet port located upstream from the MAFS, a secondary conduit isolated from the inlet air conduit, and an air pump that draws air into the inlet port, wherein the secondary conduit is disposed radially outboard of the inlet air conduit.

According to other alternative and optional aspects of the above air induction system or apparatus, the vehicle component is an exhaust system emission control apparatus, and the secondary air system provides air to an emission control apparatus that is may be a cold start thermal unit that heats the emission control apparatus under cold start conditions. Alternatively, the vehicle component may be an engine exhaust manifold. The vehicle component may be an electrically heated catalyst system, and the secondary air system may be used to provide additional air to the electrically heated catalyst system.

The air induction system may further comprise a turbocharger that provides pressurized air to the engine. Alternatively, the engine may be naturally aspirated.

The air induction system or apparatus may further comprise a second MAFS that measures the mass of the air flowing through the secondary air flow system.

A mass air flow conduit may be disposed within the inlet air conduit with the inlet port being attached to the intake end of inlet air conduit to define, at least in part, the periphery of the inlet port and the secondary conduit.

One novel aspect of this disclosure is a bypass channel separate from a mass air flow bore is open upstream from the MAFS and an outlet defined by the bypass channel provides air to the air pump.

According to yet another aspect of this disclosure the air induction system may include a flow straightener disposed in the inlet air conduit upstream from the MAFS that has a plurality of vanes that straighten the flow of air provided to the MAFS. Further, the flow straightener may be integrated in the inlet air conduit upstream from the MAFS and a bypass channel may be integrated in the inlet air conduit that defines the inlet port that is open upstream from the MAFS.

According to another aspect of this disclosure, a method is disclosed for providing filtered air to a vehicle component. According to the method, in a first step, a secondary air induction system is assembled to an inlet air conduit downstream from an air cleaner. The secondary air induction system includes an inlet port, a secondary conduit isolated from the inlet air conduit, and an air pump that draws air into the inlet port. The secondary conduit is disposed radially outboard of the inlet air conduit. Air is drawn through an air cleaner and into the inlet air conduit. A first portion of the air is supplied from the air inlet conduit to an engine. A second portion of the air is drawn into the inlet port located upstream from a mass air flow sensor disposed in the inlet air conduit. The air flows through the secondary conduit, and through an outlet port of the secondary conduit with an air pump. In a final step, air is supplied from the secondary air induction system to the vehicle component located downstream from the engine.

According to other aspects of the method, the flow of air upstream from the mass air flow sensor is straightened by a plurality of vanes and the inlet port opens into the inlet air conduit upstream from the plurality of vanes.

The vehicle component located downstream from the engine is an exhaust system emission control apparatus, and the method further comprises supplying the second portion of air to a cold start thermal unit that heats the emission control apparatus under cold start conditions.

The method may further comprise measuring the mass flow rate of the air flowing through the secondary air induction system.

The above aspects of this disclosure and other aspects will be described below with reference to the attached drawings.

DETAILED DESCRIPTION

Reference will now be made in detail to embodiments, examples of which are illustrated in the accompanying drawings. In the following detailed description, numerous specific details are set forth to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Various features illustrated and described with reference to any one of the figures may be combined with features illustrated in one or more of the other figures to produce embodiments that are not explicitly illustrated or described. The combinations of features illustrated provide representative embodiments for typical applications. Various combinations and modifications of the features consistent with the teachings of this disclosure could be used in particular applications or implementations.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
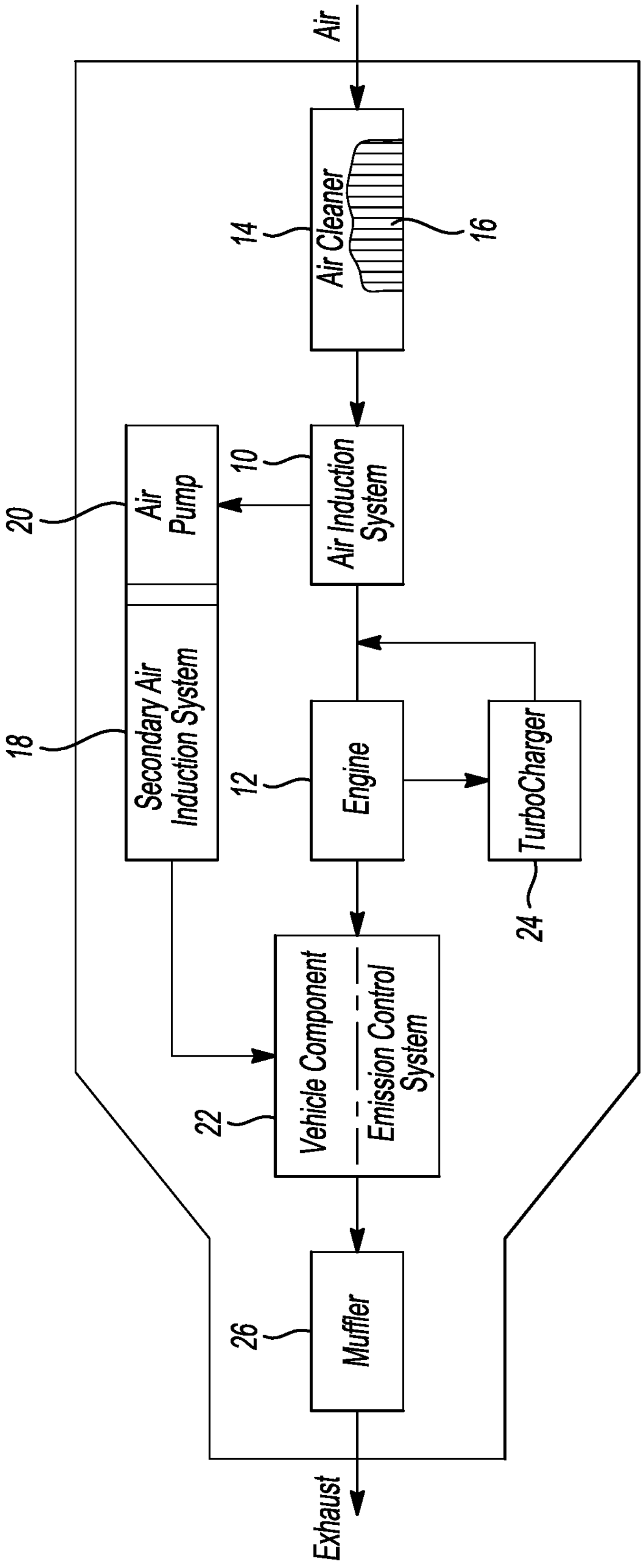
FIG. 1 is a diagrammatic view of a vehicle having an air induction system that provides air to an engine and a secondary air induction system that provides air to a vehicle component such as an emission control system.

Referring to FIG. 1, an air induction system 10 for an engine 12 is illustrated that is part of a vehicle 13. Air is received by an air cleaner 14 that encloses an air filter element 16. The air cleaner 14 and air filter element provide clean air to the engine 12. Clean air is defined as air that has passed through the air cleaner 14. A secondary air induction system 18 including an air pump 20 that draws clean air from the air induction system 10 and supplies air to a vehicle component 22.

The vehicle component 22 may be any component of the vehicle that 13 requires clean air and may take many forms. The vehicle component 22 may be an emission control system, another exhaust system component, or the like. The clean air may be used by a cold start thermal unit to reduce emissions in a cold-start situation; to provide clean air to the engine exhaust manifold at either the hot end or the cold end; or to an electrically heated catalytic system.

The system may be used with a naturally aspirated engine or with a turbocharger 24 that provides pressurized air to the engine. An engine 13 including a turbocharger 24 that is part of a high pressure system. The air discharged from the turbocharger 24 may be combined in the intake manifold of the engine 13 with the air from the air induction system 10.

A muffler 26 may be provided as part of the exhaust system of the vehicle 13. Exhaust is vented to atmosphere from the exhaust system in the normal manner.

Figure 2:
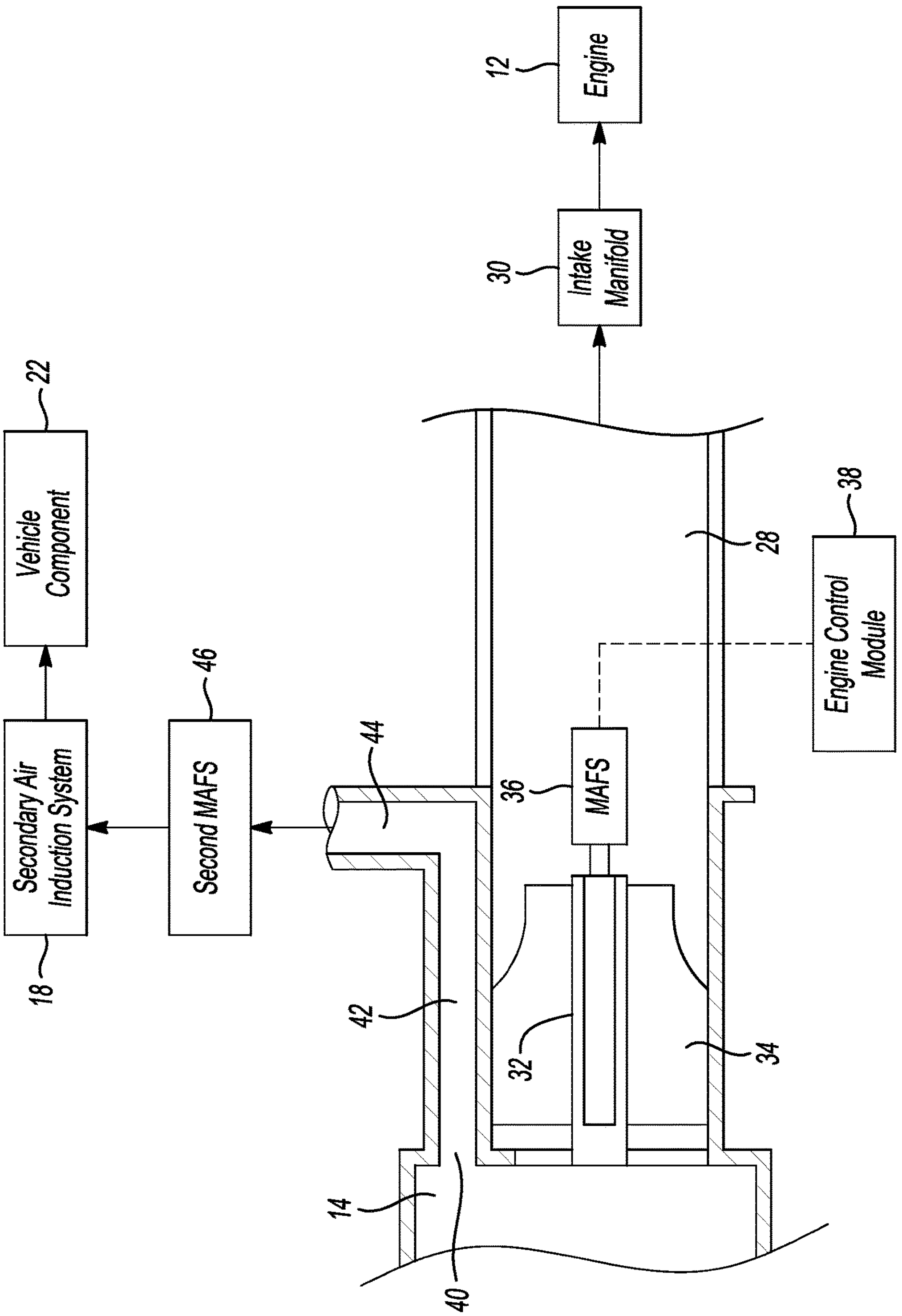
FIG. 2 is a diagrammatic cross-section view of the air induction system and secondary air induction system.

Referring to FIG. 2, an inlet air conduit 28 provides air to the intake manifold 30 of the engine 12. A flow straightener 32 is assembled into the inlet air conduit that straightens the flow of air through the inlet air conduit 28. The flow straightener has a plurality of vanes 34 that divide the flow of air into quadrants and cause the air to flow straight through the flow straightener 32 with less turbulence. A Mass Air Flow Sensor 36 (MAFS) produces an output signal that is provided to an Engine Control Module (ECM) 38.

The Engine Control Module (ECM) controls the air/fuel mixture provided to the engine 12. If the air fuel mixture is not optimal, engine operation and emissions can be compromised. If the air/fuel mixture is too rich gas mileage will be reduced and emissions will be increased. If the air/fuel mixture is too lean, engine efficiency and power output will be reduced. If the signal provided by the MAFS 36 to the ECM 38 is electronically noisy, the ECM 38 may provide an inaccurate air/fuel mixture to the engine 12 negatively affecting air/fuel calibration and environmental emissions.

The secondary air induction system 18 includes an inlet port 40 that is radially outboard relative to the air inlet conduit 28. In the embodiment of FIG. 2, the inlet port is located radially outboard of the inlet conduit 28 and at the upstream end of the inlet conduit 28. The air flow straightener 32 is provided inside the inlet air conduit 28 to straighten or otherwise condition the air flow to the MAFS.

The secondary air conduit 42 provides clean air to an outlet 44 defined by the secondary air conduit 42. The air pump 20 draws the clean air from the air cleaner 14, into the inlet 40, through the secondary conduit, or bypass channel, and through the outlet 44.

The secondary air induction system 18 may include a second MAFS 46 if the vehicle component 22 that the clean air is provided to requires measured, or metered, air volume. If the vehicle component does not require metered air flow the second MAFS 46 need not be provided.

Figure 3:
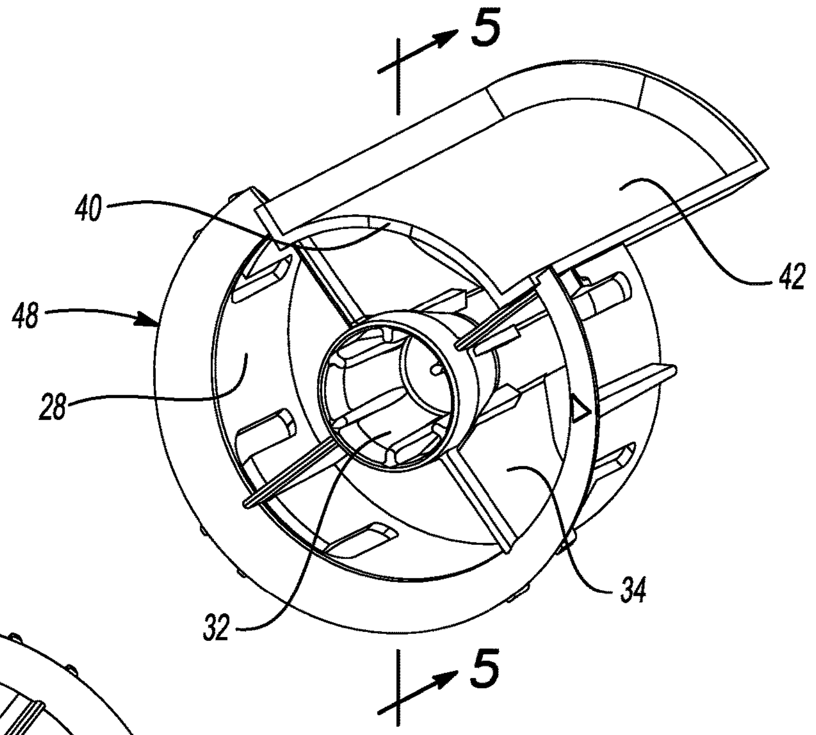
FIG. 3 is a perspective view of one embodiment of a secondary air induction assembly with the secondary air conduit integrated with the air flow straightener.
Figure 4:
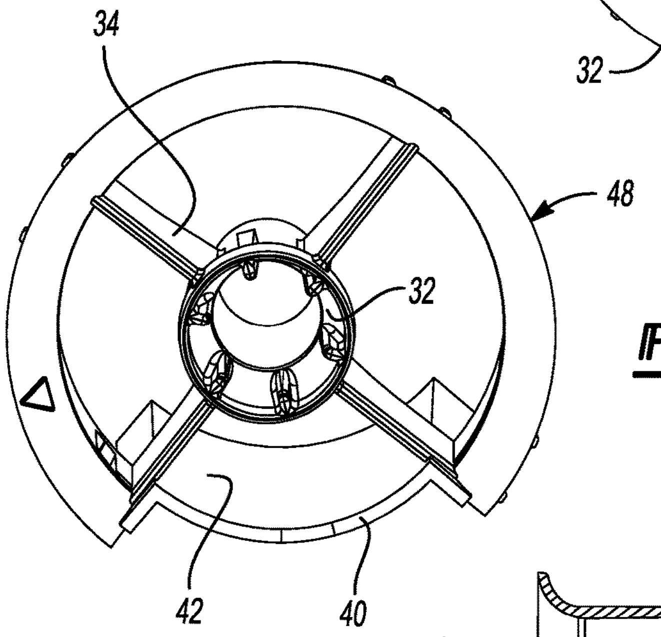
FIG. 4 is a front elevation view of the assembly of FIG. 3.
Figure 5:
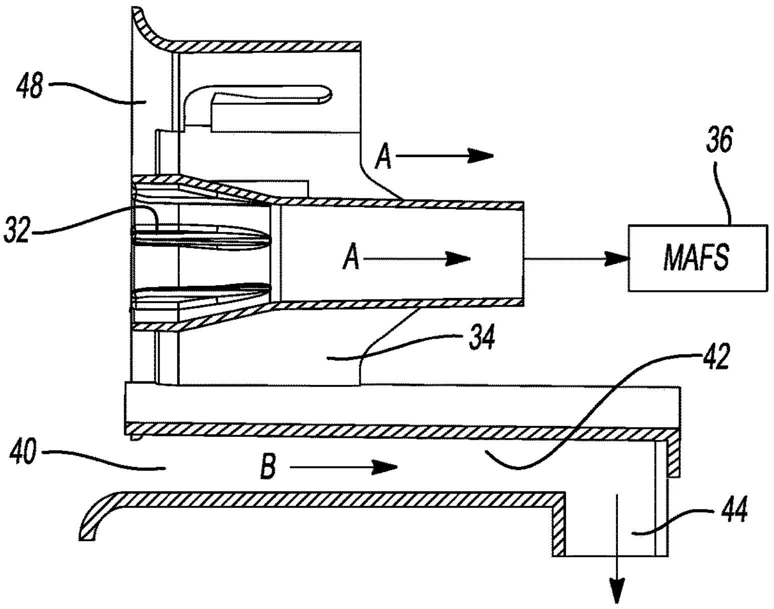
FIG. 5 is a cross-section view taken along the line A-A in FIG. 3.
Figure 6:
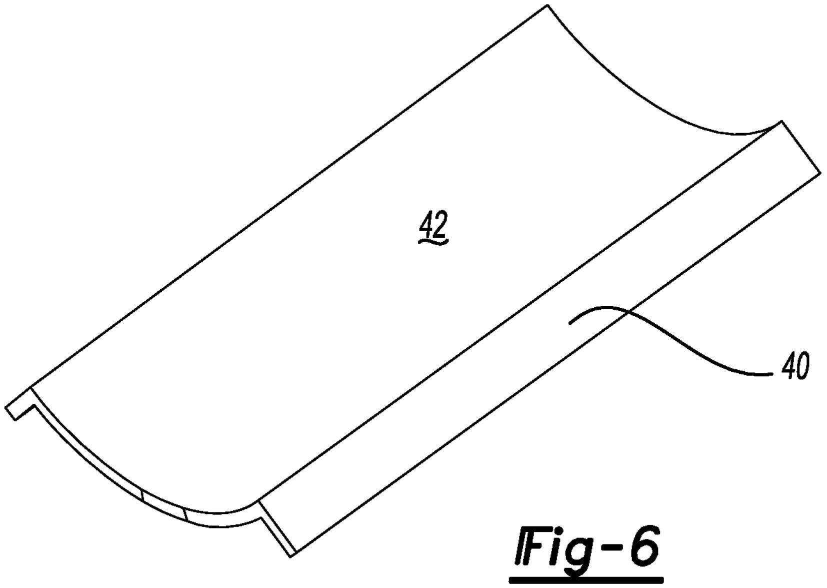
FIG. 6 is a perspective view of a secondary air induction conduit that is independent of the air flow straightener.
Figure 7:
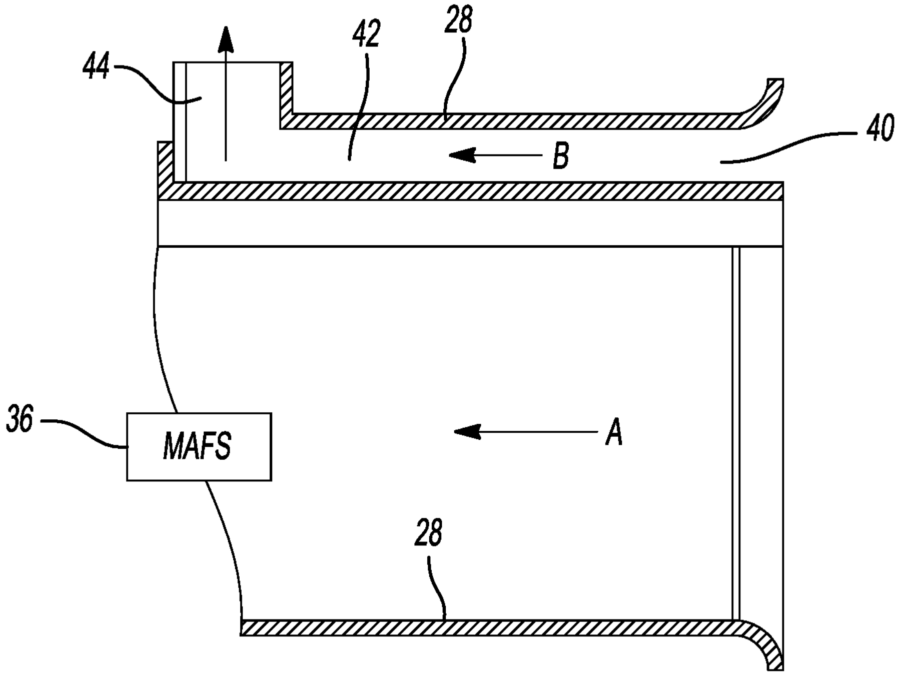
FIG. 7 is a cross-section view similar to the cross-section view of FIG. 5 of the secondary air induction conduit without the flow straightener.

Referring to FIGS. 3-5, one embodiment of an air induction system 10 is partially illustrated. This novel aspect includes an integrated flow straightener 32 and bypass channel 42 that are provided as a separate metal or plastic insert 48 from the inlet air conduit 28. The air induction system 10 is this embodiment is intended to be used with a cylindrical air cleaner (not shown) upstream from the inlet air conduit 28. The insert 48 may be molded, cast, or 3D printed. The insert 48 may be fastened to the inlet air conduit 28 by a snap fit, mechanical fasteners, insert molded, plastic welding, adhesive, or by a press-fit.

Referring to Figures in 6-7, the bypass conduit 42, or secondary conduit, is shown in Figure in isolation to illustrate that the secondary conduit 42 may be provided without the flow straightener 32 (shown in FIGS. 3-5). The bypass conduit 42 is separate from the inlet air conduit 28, or MAFS bore, and can be assembled into the inlet air conduit 28. In some designs, no air flow straightener 32, or air flow conditioner, may be required upstream from the MAFS. The bypass conduit 42 can be molded, cast, 3D printed, or stamped as a sheet metal part. The insert 48 may be fastened to the inlet air conduit 28 by a snap fit, mechanical fasteners, insert molded, plastic welding, adhesive, or by press-fitting.

Figure 8:
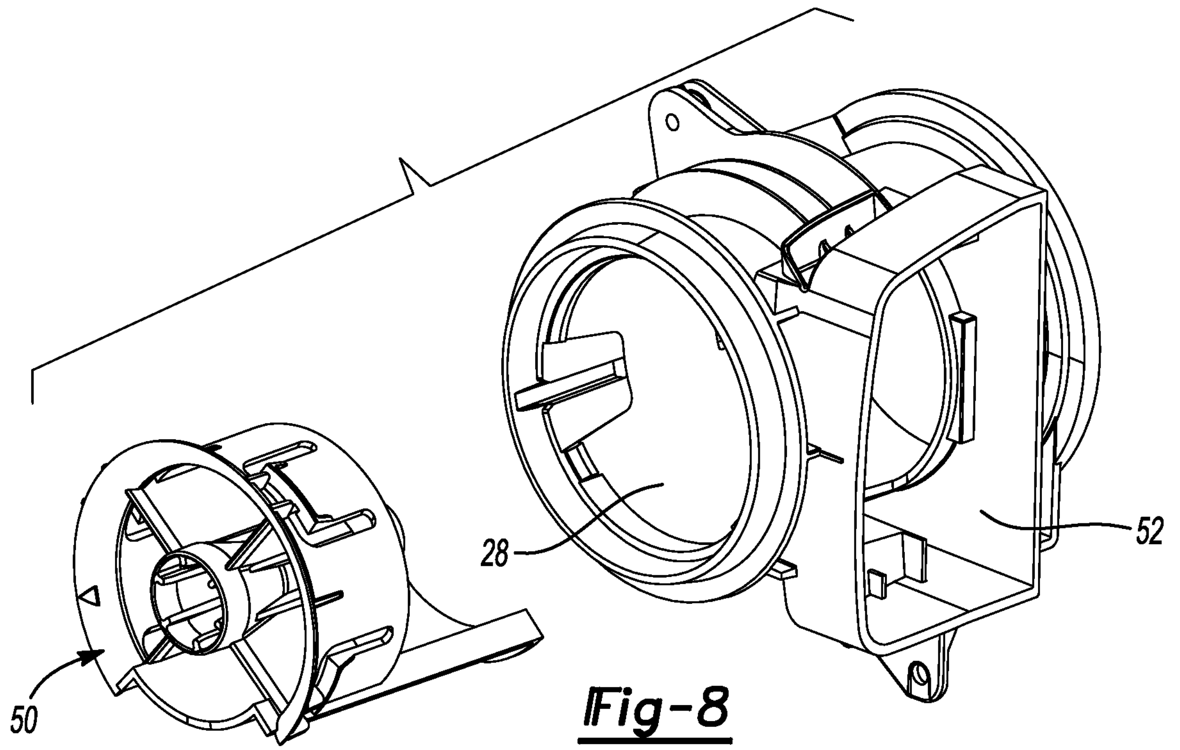
FIG. 8 is a perspective view of an insert separated from a housing for a rectangular air filter.
Figure 9:
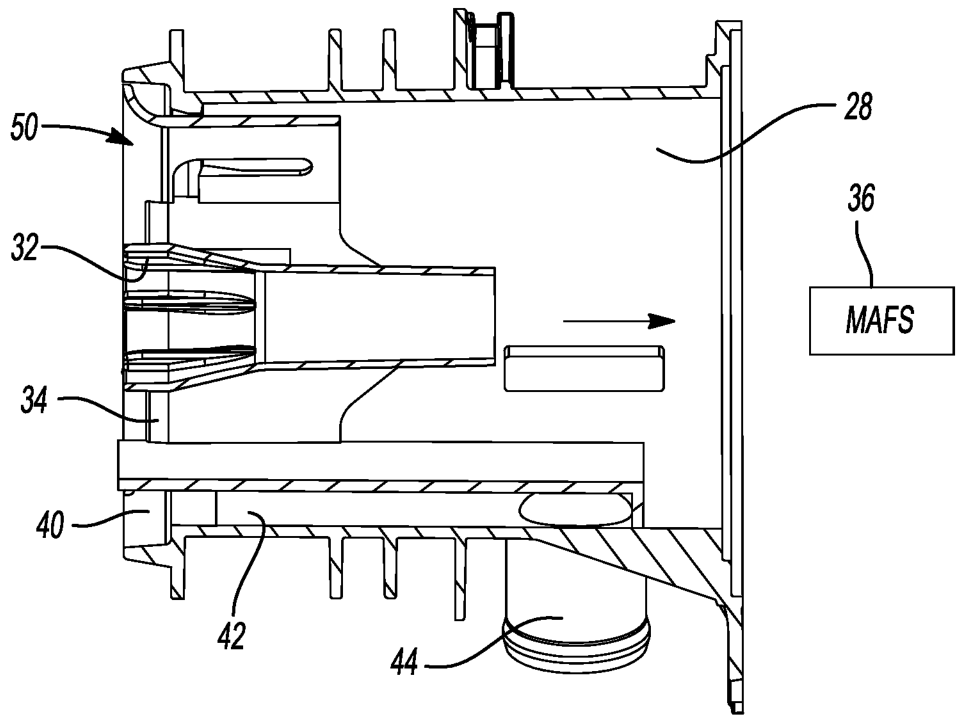
FIG. 9 is a cross-section view similar to the cross-section view of FIG. 5 of the secondary air induction conduit with the flow straightener.

Referring to FIGS. 8-9 and provided as an insert 50, another embodiment is illustrated wherein the flow straightener 32 including the vanes 34 and bypass channel 42 may be fully integrated into the MAFS bore 28. The embodiment of FIGS. 8 and 9 is shown with a rectangular housing 52 for the filter media (not shown). The entire part can be molded, stamped, cast, or 3D printed. The integrated part may be made of metal or plastic or a combination of both materials.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An air induction system for an engine comprising: an air cleaner enclosing a filter element that removes contaminants from air supplied to the engine; an inlet air conduit defines an upstream end of the inlet air conduit disposed downstream from the air cleaner, wherein the inlet air conduit supplies air to the engine; a mass air flow sensor (MAFS) disposed in the inlet air conduit measures the mass of air flowing through the inlet air conduit to an intake manifold of the engine and provides mass air flow data to an engine control module; and a secondary air system receives air from the air cleaner that is provided to a vehicle component, the secondary air system includes an inlet port located upstream from the MAFS, a secondary conduit attached to an outer surface of the inlet air conduit, wherein the secondary conduit is isolated from the inlet air conduit, wherein the inlet port of the secondary conduit is disposed radially outboard of the upstream end of the inlet air conduit, and an air pump that draws air into the inlet port, wherein the inlet port of the secondary conduit is disposed radially outboard of the upstream end of the inlet air conduit and wherein the upstream end and the inlet port are at substantially the same distance from the air cleaner.

2. The air induction system of claim 1 wherein the vehicle component is an exhaust system emission control apparatus, and wherein the secondary air system provides additional air to the emission control apparatus, wherein the emission control apparatus is a cold start thermal unit to heat the emission control apparatus under cold start conditions.

3. The air induction system of claim 1 wherein the vehicle component is an engine exhaust manifold.

4. The air induction system of claim 1 wherein the vehicle component is an exhaust system emission control apparatus, and wherein the secondary air system provides additional air to the emission control apparatus, wherein the emission control apparatus is an electrically heated catalyst system.

5. The air induction system of claim 1 further comprises:

a boost system provides pressurized air to the engine.

6. The air induction system of claim 1 wherein the engine is naturally aspirated.

7. The air induction system of claim 1 further comprising:

a second MAFS that measures the mass of the air flowing through the secondary air flow system.

8. The air induction system of claim 1 further comprising:

a mass air flow conduit disposed within the inlet air conduit, wherein the inlet port is attached to the upstream end of the inlet air conduit to define, at least in part, a periphery of the inlet port and the secondary conduit.

9. The air induction system of claim 1 further comprising:

a bypass channel separate from a mass air flow bore defined by the inlet port, wherein the inlet port is open upstream from the MAFS, and wherein an outlet defined by the bypass channel provides air to the air pump.

10. The air induction system of claim 1 further comprising:

a flow straightener disposed in the inlet air conduit upstream from the MAFS includes a plurality of vanes that straighten the flow of air provided to the MAFS, wherein the flow straightener defines a flow straightener inlet port, and wherein the inlet port of the secondary conduit is disposed radially outboard of the flow straightener inlet port.

11. The air induction system of claim 1 further comprising:

a flow straightener integrated in the inlet air conduit upstream from the MAFS includes a plurality of vanes that straighten the flow of air provided to the MAFS; and a bypass channel defined by and integrated in the flow straightener, wherein the bypass channel defines an inlet port that is open upstream from the MAFS, and wherein an outlet defined by the bypass channel provides air to the air pump.

12. An apparatus comprising:

an engine having an air induction system that supplies air to the engine at a controlled rate by an engine control module that controls the air/fuel mixture provided to the engine, the air induction system having a Mass Air Flow Sensor (MAFS) disposed inside an inlet air conduit of the air induction system, wherein the inlet air conduit includes an upstream end; and a secondary air flow system provides air to a vehicle component, the secondary air flow system includes an inlet port located upstream from the MAFS, wherein the inlet port of the secondary air flow system is disposed radially outboard of the upstream end, and wherein the inlet port and the upstream end are at substantially the same distance from the air cleaner, and a flow straightener disposed inside the inlet air conduit that defines a flow straightener inlet port located at the upstream end of the inlet air conduit, and wherein the inlet port of the secondary conduit is disposed radially outboard of the flow straightener inlet port of the flow straightener, wherein the inlet port supplies air to a secondary conduit isolated from the inlet air conduit, and an air pump that draws air into the inlet port, wherein the secondary conduit is disposed radially outboard of the inlet air conduit.

13. The apparatus of claim 12 further comprising:

a mass air flow conduit disposed within the secondary conduit, wherein the inlet port is defined by the intake end of secondary conduit to define, at least in part, the periphery of the inlet port and the secondary conduit.

14. The apparatus of claim 12 further comprising:

a bypass channel separate from a mass air flow bore defined by the inlet air conduit, wherein the inlet port is open upstream from the MAFS, and wherein an outlet defined by the bypass channel provides air to the air pump.

15. The apparatus of claim 12 further comprising:

a flow straightener integrated in the inlet air conduit upstream from the MAFS includes a plurality of vanes that straighten the flow of air provided to the MAFS, and wherein the secondary air flow system includes a bypass channel defines an inlet port that is open upstream from the MAFS, and wherein an outlet defined by the bypass channel provides air to the air pump.

16. The apparatus of claim 12 wherein the flow straightener is disposed in the inlet air conduit upstream from the MAFS and includes a plurality of vanes that straighten the flow of air provided to the MAFS.

17. A method of providing filtered air to a vehicle component comprising:

assembling a secondary air induction system to an inlet air conduit downstream from an air cleaner, wherein the air inlet conduit has an upstream end, wherein the secondary air induction system includes an inlet port, a secondary conduit isolated from the inlet air conduit, and an air pump that draws air into the inlet port, wherein the secondary conduit is disposed radially outboard and is attached to an external surface of the inlet air conduit with the inlet port radially outboard and axially aligned with the upstream end;

drawing air through an air cleaner and into the inlet air conduit;

supplying a first portion of the air from the air inlet conduit to an engine;

drawing a second portion of the air into the inlet port located at an axial distance upstream from a mass air flow sensor disposed in the inlet air conduit, wherein the upstream end and inlet port are located at the same axial distance from the mass airflow sensor, wherein the air is drawn through the secondary conduit, and through an outlet port of the secondary air induction system with an air pump; and supplying air from the secondary air induction system to the vehicle component located downstream from the engine.

18. The method of claim 17 further comprising:

straightening the flow of air upstream from the mass air flow sensor with a plurality of vanes, wherein the inlet port opens into the inlet air conduit upstream from the plurality of vanes.

19. The method of claim 17 wherein the vehicle component located downstream from the engine is an exhaust system emission control apparatus, and further comprises:

supplying the second portion of air to the emission control apparatus, wherein the emission control apparatus is a cold start thermal unit that heats the emission control apparatus under cold start conditions.

20. The method of claim 17 further comprising:

measuring the mass flow rate of the air flowing through the secondary air induction system.

* * * * *